United States Patent [19]

Dammann

[11] Patent Number: 4,495,367
[45] Date of Patent: Jan. 22, 1985

[54] HIGH CHARGE DENSITY, CATIONIC METHACRYLAMIDE BASED MONOMERS AND THEIR POLYMERS

[75] Inventor: Laurence G. Dammann, Crestwood, Ky.

[73] Assignee: Celanese Corporation, New York, N.Y.

[21] Appl. No.: 563,012

[22] Filed: Dec. 19, 1983

Related U.S. Application Data

[63] Continuation of Ser. No. 395,420, Jul. 6, 1982, abandoned.

[51] Int. Cl.³ .............................................. C07C 103/70
[52] U.S. Cl. .................................. 564/208; 526/303.1
[58] Field of Search ........................................ 564/208

[56] References Cited

U.S. PATENT DOCUMENTS

| | | | |
|---|---|---|---|
| 3,178,385 | 4/1965 | Dinges et al. | 260/29.4 |
| 3,666,810 | 5/1972 | Hoke | 260/561 N |
| 3,689,468 | 9/1972 | Cenci et al. | 260/86.1 |
| 3,766,156 | 10/1973 | Kine et al. | 260/86.1 N |
| 3,962,332 | 6/1976 | Trapasso | 260/561 N |
| 4,009,201 | 2/1977 | Steckler et al. | 260/486 R |
| 4,180,643 | 12/1979 | Moss et al. | 528/52 |
| 4,212,820 | 7/1980 | Hotchkiss et al. | 260/561 N |
| 4,387,017 | 1/1983 | McEntire et al. | 208/188 |
| 4,409,110 | 10/1983 | Borchardt et al. | 252/8.55 R X |

FOREIGN PATENT DOCUMENTS 2091320  7/1982  United Kingdom .

Primary Examiner—Thomas A. Waltz
Attorney, Agent, or Firm—Herbert P. Price

[57] ABSTRACT

A new composition of matter comprising an acrylamide or methacrylamide monomer characterized by the following structural formula:

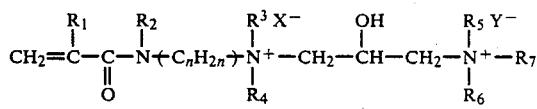

wherein $R_1$ and $R_2$ are hydrogen or methyl; $R_3$, $R_4$, $R_5$, $R_6$ and $R_7$ are lower alkyls; n is an integer ranging from 1 to 6; and X and Y are the same or different anions.

2 Claims, No Drawings

HIGH CHARGE DENSITY, CATIONIC METHACRYLAMIDE BASED MONOMERS AND THEIR POLYMERS

This is a continuation of Ser. No. 395,420, filed July 6, 1982, now abandoned.

FIELD OF THE INVENTION

This invention relates to novel acrylamide or methacrylamide monomers and polymers and processes of synthesizing the same. More particularly, the present invention relates to bis-quaternary ammonium acrylamide or methacrylamide monomers and polymers.

DESCRIPTION OF THE PRIOR ART

Quaternary ammonium monomers of the acrylamide or methacrylamide type are set out in U.S. Pat. Nos. 3,666,810, 4,180,643 and 4,212,820. U.S. Pat. No. 3,962,332 discloses a di-olefinically unsaturated compound which contains two quaternary ammonium moieties. The polymers and co-polymers of the bis-quaternary compounds are characterized by high charge density, and find application as flocculants, paper sizes and electroconductive aids. U.S. Pat. Nos. 3,689,468, 3,766,156, and 4,009,201 disclose acrylic acid ester monomers and polymers containing a bis-quaternary ammonium halide group for use in a variety of environments, including anti-static agents, flocculants, etc. These compounds, however, contain a hydrolytically unstable ester linkage which renders the polymers formed from those cationic monomers less than suitable when used in aqueous systems. Accordingly, there is an ever-continuing effort to find stable novel cationic monomers of the above type which may show unique utilities in areas of application not possessed by similar prior art materials of this class.

Thus, it is an object of the present invention to prepare a new class of cationic acrylamides and methacrylamides which are useful for a wide variety of purposes normally requiring ionic charged monomers of this type.

SUMMARY OF THE INVENTION

The invention relates to acrylamide and methacrylamide monomers characterized by the following formula:

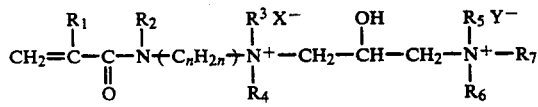

wherein $R_1$ and $R_2$ are hydrogen or methyl, $R_3$, $R_4$, $R_5$, $R_6$ and $R_7$ are lower alkyls of 1 to 4 carbon atoms, n is an integer ranging from 1 to 6 and X and Y are the same or different anion.

DESCRIPTION OF THE PREFERRED EMBODIMENT

In one method a preferred monomer from the above defined class of unsaturated bis-quaternary organic compounds can be synthesized by reacting a 1-chloro-2-hydroxypropyl trimethylammonium halide (e.g., chloride, bromide, fluoride or iodide) with dimethylaminopropylacrylamide or with dimethylaminopropylmethacrylamide.

The synthesis can be conducted conveniently by dissolving the reactants in water or other inert polar solvent such as alcohols including methanol, ethanol, isopropanol, and butanol, benzene, toluene, xylene, acetonitrile, dimethylformamide, tetrahydrofuran, acetone, dioxane, and the, like. Mixtures of water and one of the organic solvents mentioned, whether miscible with the water or not, may be used. Preferably the reaction mixture is heated to a temperature in the range from about 40° C. up to the refluxing temperature of the reaction mixture. The time of reaction varies between several minutes and several hours depending mainly on the reaction temperature. The reactants are usually employed in approximately equimolar proportions. It is advantageous to maintain the pH of the system at about 7 so as to prevent hydrolysis of amido groups in the compounds. It is a particular advantage of the present invention compounds that they do not contain easily hydrolyzable ester groups.

By the method of synthesis described above, there are produced compounds of structural Formula I in which the anions are of the halide type. These anions can be replaced with other anions by conventional techniques such as by contacting the quaternary halides with an appropriate ion exchange resin. Examples of various anions for X and Y include hydroxide, nitrate, sulfate, sodium acid sulfate, chromate, phosphate, methyl sulfate, acetate, formate, oxalate, sulfamate, acrylate, and the like.

The unsaturated bis-quaternary monomeric compounds of the present invention are readily polymerizable, and the aqueous solutions resulting from the above-described synthesis can be employed directly for this purpose. Any known polymerization initiator of the free radical type may be selected for use, such as t-butyl hydroperoxide, ammonium persulfate, alkali metal persulfates, the tetra sodium salt of ethylene diamine tetraacetic acid (EDTA), and 2,2'-Azobis(2-amidinopropane) hydrochloride and mixtures thereof. The initiator is usually effective in quantities between about 0.01% and 5% by weight, based on the weight of the unsaturated bis-quaternary monomer. A redox initiator system can be provided by including a reducing agent such as sodium hydrosulfite in the initiator system.

These new unsaturated bis-quaternary compounds can be co-polymerized with any other polymerizable olefinically unsaturated monomer, preferably in aqueous solution and emulsion polymerization systems with redox initiation. Highly preferred co-polymers of the present invention, which exhibit outstanding properties for application as flocculants and electroconductive aids, are those comprising acrylamide co-polymerized with an unsaturated bis-quaternary compound of structural Formula I. Any other water soluble monomer can be co-polymerized with the monomer of Formula I. Preferred water soluble monomers include acrylic and methacrylic acid, hydroxyethyl acrylate or methacrylate, hydroxypropyl acrylate or methacrylate, N-methylol acrylamide, N-monoalkyl and -dialkyl acrylamides and methacrylamides.

An alternative method for producing co-polymers containing the monomer of Formula I is by reacting a polymerizable monomer such as the preferred acrylamide with dimethylaminopropylacrylamide or with dimethylaminopropylmethacrylamide. The co-polymer so produced, is then quaternized by reaction with 1-chloro-2-hydroxypropyl trimethylammonium halide.

The co-polymers can contain between about 0.1% and 95% of a co-monomer. However, the preferred range for most applications is limited to about 5% and 70% of a co-monomer, where water-solubility and high charge densities are controlling factors and require the presence of a high population of quaternary groups in the co-polymers.

The polymers and co-polymers of the present invention are viscous to solid resinous materials of water-soluble character. They are generally also partially soluble or dispersible in polar organic solvents such as methanol, acetonitrile, tetrahydrofuran and the like. The molecular weight of the polymers and co-polymers is in the range from about 20,000 to 2,000,000, and preferably, the molecular weight is at least 500,000.

It is an important feature of the present invention that the monomers having structural Formula I do not contain ester linkages, and therefore homo-polymers and co-polymers thereof exhibit outstanding resistance to hydrolysis and chemical degradation. The polymer and co-polymers are therefore versatile in a wide range of applications under extreme conditions of temperature and chemical environment.

A polymeric composition of the present invention can be incorporated into paper pulp to render it electroconductive for the production of paper stock for electrostatic image reproduction systems. A quantity of between about 0.1% and 10% by weight of the polymer, based on dry fiber weight, can be added to the wood pulp. Pigments and other additives known and used in the paper art can be included.

The polymeric compositions of the present invention are suitable for application for paper sizing and as wet strength agents. Co-polymers containing between 0.1% and 20% by weight of bis-quaternary compounds of structural Formula I are useful for forming films and coatings having resistance to development of electrostatic charges.

The water-soluble polymeric compositions are generally useful as focculants, particularly the polymeric compositions containing at least 60% by weight of the bis-quaternary compounds of structural Formula I. The addition of between about 0.01% and 10% by weight of polymer, based on the weight of suspended solids (e.g., sewage sludge or paper pulp effluent) serves to flocculate the suspended matter and facilitate fitration procedures.

The following examples are futher illustrative of the present invention. The reactants and other specific ingredients are presented as being typical, and various modifications can be devised in view of the foregoing disclosure within the scope of the invention.

EXAMPLE I

To 255 g (1.5 moles) of dimethylaminopropyl methacrylamide (DMAPMA of Texaco Chemical Co.) is added 578.6 g (1.5 moles) of 50.2% aqueous 1-chloro-2-hydroxypropyl trimethylammonium chloride (Quat 188 of Dow Chemical Co.). The resulting solution is heated at 70° C. for 4 hours. The resulting bis-quaternary monomer has a solids content of 74.6% and a pH of 8.1. The calculated monomer content is 65.4%.

EXAMPLE II

To 255 g (1.5 moles) DMAPMA is added 555 g (1.5 moles) 51.5% active Quat 188. The solution is heated at 80° C. for 4 hours with a nitrogen sparge during the last 20 minutes. To this is added 0.1 g tetra sodium salt of EDTA and 0.4 g 2,2'-Azobis (2-amidinopropane) hydrochloride (V-50 catalyst of Crescent Chemical Co.) in 10 ml H$_2$O. Heating is continued at 80° C. under N$_2$ sparge for 4 hours. A total of 400 g of H$_2$O is added during this time to reduce the viscosity. A second 0.2 g of 2,2'-Azobis (2-amidinopropane) hydrochloride in 5 ml H$_2$O is added and heating is continued for 2 hours more at 80° C. under N$_2$. Another 100 g H$_2$O is added during this period. On cooling a viscous, amber polymer solution results with a pH of 7.2. The % NV is 47.2% with a calculated polymer content of 40.8%.

EXAMPLE III

The following is charged to a 2 liter 3 neck flask:
70 g H$_2$O
100 g 50% Aqueous Acrylamide
229 g Bis-quaternary monomer of Example I
0.1 g Na$_4$EDTA The solution is sparged with N$_2$ for 20 minutes while heating to 80° C. 2,2'-Azobis (2-amidinopropane) hydrochloride, 0.2 g in 1 ml H$_2$O, is added and heating is continued at 80° C. for 2 hours under N$_2$. A total of 500 g H$_2$O is added. A second 0.1 g of 2,2'Azobis (2-amidinopropane) hydrochloride is added and heating is continued at 80° C. for 2 hours more under N$_2$. A total of 100 g H$_2$O is added during the second heating period. On cooling a viscous, amber co-polymer solution with a pH of 6.9 results. The % NV is 22.7% with a calculated polymer content of 20%.

EXAMPLE IV

To demonstrate the superior flocculation activity of polymers containing the monomers of the present invention, a homo-polymer of this invention is compared to a homo-polymer of the prior art. The homo-polymer of the prior art is based on the monomer (U.S. Pat. No. 3,766,156):

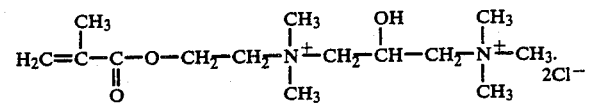

which contains a hydrolytically unstable ester linkage. Both homo-polymers are evaluated on an Erie iron ore slime for their clarification efficiency. A 100 ml cylinder is filled with the iron ore slime and the polymer dosage is added. After inverting 5 times, it is allowed to stand 5 minutes. An aliquot is then taken and the turbidity is measured in ppm using a Hach Model 2100A Turbidimeter.

| | Erie Slimes, Turbidity in ppm | |
|---|---|---|
| Dosage ppm | Amide Based Bis—quat Homopolymer Example II | Ester Based Bis—quat Homopolymer |
| 2 | 370 | 1840 |
| 4 | 340 | 495 |
| 6 | 240 | 176 |

It can be seen that the amide based bis-quat homopolymers of this invention give superior clarity at lower dosage levels.

EXAMPLE V

The amide based bis-quat homo-polymer of Example II is compared versus a prior art amide based quat homo-polymer based on the monomer:

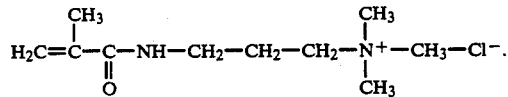

They are compared for their ability to inhibit the swelling of 100 mesh bentonite clay particles. To 90 ml of water containing a dosage of polymer is slurried 10 g of 100 mesh bentonite. The slurry is hot rolled at 150° F. overnight then sieved to isolate the bentonite. The bentonite is dried and weighed. For complete inhibition all the bentonite is recovered and its texture is much the same as that originally added.

| Clay Swell Inhibition | Minimum Usage Level for Complete Inhibition |
|---|---|
| Amide based bis-quat homo-polymer (Example II) | 1% |
| Amide based quat homopolymer of prior art | 2% |

Again the superior properties of polymers of this invention are demonstrated by their lower usage levels.

What is claimed is:

1. A compound of the formula:

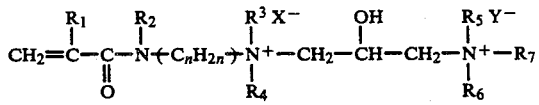

wherein:
$R_1$ and $R_2$ are hydrogen or methyl,
$R_3$, $R_4$, $R_5$, $R_6$ and $R_7$ are the same or different lower alkyls,
n is an integer ranging from 1 to 6, and
X and Y are the same or different anion.

2. A compound as defined in claim 1 in which X and Y are halogen ions.